Patented July 19, 1932

1,868,079

UNITED STATES PATENT OFFICE

FRITZ SEEBACH, OF ERKNER, NEAR BERLIN, GERMANY, ASSIGNOR TO BAKELITE GESELLSCHAFT MIT BESCHRANKTER HAFTUNG OF BERLIN-CHARLOTTENBURG, GERMANY

PROCESS FOR THE PURIFICATION OF PHENOL-ALDEHYDE RESINS

No Drawing. Application filed July 10, 1929, Serial No. 377,344, and in Germany July 17, 1928.

The condensation products of phenols and aldehydes usually contain a slight percentage of uncombined phenols, for instance carbolic acid or cresols. In the working up of phenolic resins the uncombined phenols involve difficulties, and therefore it is an old technical problem to keep the quantity of uncombined phenols as low as possible. It is well known that in the manufacture of phenol-methylene resins the uncombined phenols are removed by evaporating them in a vacuum. Thereby the free phenols are removed in form of vapours, accompanied by water and volatile contact substances. The permanently fusible condensation products (novolaks) may be heated at relatively high temperatures and freed from uncombined phenols. In contradistinction to the novolaks uncombined phenols cannot be liberated from reactive phenol-methylene resins by evaporation. It is well known that these resins under the influence of heat gradually become insoluble in the usual solvents. Therefore, when distilling the uncombined phenols from the reactive resins the temperature should not be increased beyond a certain limit. A polymerization of the reactive resin may also take place at relatively low temperatures if the resin is heated for a long time. It has been suggested to remove the free phenols from the reactive phenolic resins by distilling after adding indifferent fluxes or diluting agents, but nevertheless it was impossible to avoid the polymerization of the resins during the distillation.

I have found that reactive phenol-methylene resin may be heated without polymerization for any length of time, say for several hours or even days, after dissolving it in the solution of a salt which is capable of preventing the polymerization of phenolic condensation products. The free phenol may be completely removed from the dissolved resin by distilling the said solution, if the evaporated liquid is replaced by adding to the solution corresponding quantities of solvent for the salt. From the distillate the phenol may be separated and used again for the preparation of resin. The purified solution of the condensation products is diluted with a suitable quantity of the solvent for the salt in order to precipitate the purified resin, which may be separated from the liquid, for instance by filtration. The remaining salt solution may be concentrated by evaporation in order to be used for the purification of further quantities of resin.

For instance 500 kgs. of phenol-aldehyde condensation product in the so-called A-condition are dissolved in a solution of 250 kgs. of aniline hydrochloride in 250 kgs. of water. This solution is stirred and heated up to 50-60° C., until all the resin has been dissolved. The solution is further heated under atmospheric pressure until 1000-2000 kgs. of water have been distilled off. During the distillation the evaporated water is replaced by adding from time to time suitable quantities of hot water to the solution. For instance, every ten minutes 20 kgs. of water are evaporated and the same quantity of preheated water is introduced into the solution. The evaporated water may also be replaced by hot water continuously. It is advisable to provide the still with a stirrer. The distillation may be carried out at a reduced pressure. When distilling under ordinary pressure, the resin solution is boiling at about 103-105° C. The distillation temperature under atmospheric pressure may be higher, say for instance 120° C., if the solution is more highly concentrated. When distilling at reduced pressure the evaporation takes place at a lower temperature. It is not advisable to distil under too high a vacuum, too low a boiling temperature rendering the solution too viscous. The distillation may also be carried out with superheated steam or by blowing suitable gases through the solution, for instance carbondioxide, nitrogen or any other inert gases. Care has preferably to be taken by means of a stirrer of a permanent and regular circulation of the solution.

Instead of aniline hydrochloride other salts may be employed, for instance nitrate or hydrobromide of aniline. The compound of aniline and chloroacetic acid is likewise suited. It is also possible to mix the phenolic resin with aniline with heating, adding the necessary quantity of hydrochloric acid and water, until a mixture of the composition described in the above example is obtained. The hydrochloride of aniline may also be added to the reaction mass of phenol and aldehyde, thereafter mixing the condensation product with sufficient quantity of water and carrying out the distillation of the solution obtained as described above. Instead of aniline salts, salts of other suitable aromatic or aliphatic amines may be employed.

During the distillation the volume of the heated resin solution preferably should always remain about the same, no matter whether the distillation is carried out at ordinary or reduced pressure, or by introducing superheated steam or gases into the solution. In the distillation at ordinary or reduced pressure the quantity of solvent to be replaced in the still is equal to the distillate condensed. In the distillation with superheated steam, the volume of the liquid in the distillation still has to be directly observed, in order to maintain the original quantity of distillant, or, in other words, to maintain sufficient solvent for the salt to thereby retain the resin in solution.

After the distillation the solution free from phenols is mixed with water, for instance with the equal weight. Herewith the purified phenolic resin is precipitated, by reason of the insolubility of the resin in the so-diluted solution of the aniline salt, while the aniline hydrochloride or other salt used for dissolving remains in the solution. The purified resins show at the average 0.3-0.6% of bromine absorbing substances. In the usual phenolic resin solvents they are easily dissolved, and, being free of uncombined phenols, they give products of better qualities, compared to the usual phenolic resins. From the distillates the free phenols may be recovered. After having precipitated the phenolic resins, the salt solution is separated and concentrated in order to be employed again.

For carrying out my process solutions made with organic solvents or with mixtures of organic solvents and water may also be used. For instance, salt solutions may be employed which, instead of water, contain as solvent cyclohexanol or a mixture of water and alcohol. The solvent evaporated may be replaced by adding a corresponding amount of other solvents to the solution of resins, for instance replacing the evaporated water by alcohol.

The precipitated resins may be washed out with solutions of hydrotropic salts, for instance with solutions of soda soap.

What I claim is:—

1. Process for the purification of a phenol-aldehyde resin containing a free phenol, which comprises dissolving the resin in a solution of an aniline salt, and distilling the solution for the purpose of removing free phenol.

2. Process for the purification of a phenol-aldehyde resin containing a free phenol, which comprises dissolving the resin in a solution of aniline hydrochloride and distilling the solution for the purpose of removing free phenol.

3. Process for the purification of a phenol-aldehyde resin containing a free phenol, which comprises dissolving the resin in an aqueous solution of aniline hydrochloride and distilling the solution for the purpose of removing free phenol.

In testimony whereof, I affix my signature.

FRITZ SEEBACH.